US012682463B2

(12) United States Patent
Kashiwakura et al.

(10) Patent No.: US 12,682,463 B2
(45) Date of Patent: Jul. 14, 2026

(54) INFORMATION PROCESSING DEVICE FOR DETECTION OF BACKGROUND OF IMAGE

(71) Applicant: TOYOTA JIDOSHA KABUSHIKI KAISHA, Toyota (JP)

(72) Inventors: Toshiki Kashiwakura, Tokyo (JP); Chihiro Inaba, Tokyo (JP); Takurou Sakai, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 253 days.

(21) Appl. No.: 18/429,774

(22) Filed: Feb. 1, 2024

(65) Prior Publication Data

US 2024/0281982 A1     Aug. 22, 2024

(30) Foreign Application Priority Data

Feb. 20, 2023    (JP) ................................. 2023-024554

(51) Int. Cl.
  *G06T 7/194* (2017.01)
  *G06T 5/77* (2024.01)
  *G06T 7/00* (2017.01)
(52) U.S. Cl.
  CPC .............. *G06T 7/194* (2017.01); *G06T 5/77* (2024.01); *G06T 7/0002* (2013.01); *G06T 2207/10024* (2013.01); *G06T 2207/20081* (2013.01); *G06T 2207/30268* (2013.01)
(58) Field of Classification Search
  CPC ......... G06T 7/194; G06T 5/77; G06T 7/0002; G06T 2207/10024; G06T 2207/20081; G06T 2207/30268
  See application file for complete search history.

(56) References Cited

U.S. PATENT DOCUMENTS

| | | | |
|---|---|---|---|
| 2008/0247599 A1 | 10/2008 | Porikli et al. | |
| 2021/0158534 A1 | 5/2021 | Kakinuma et al. | |
| 2021/0358204 A1* | 11/2021 | Yoneda | G06T 15/60 |

FOREIGN PATENT DOCUMENTS

| JP | 2010-058903 A | 3/2010 |
|---|---|---|
| JP | 4792069 B2 | 10/2011 |
| JP | 5058010 B2 | 10/2012 |

(Continued)

OTHER PUBLICATIONS

Zhang et al, "No Shadow Left Behind: Removing Objects and their Shadows using Approximate Lighting and Geometry", 2021, IEEE/CVF Conference on Computer Vision and Pattern Recognition, pp. 16397-16406 (Year: 2021).*

(Continued)

*Primary Examiner* — David F Dunphy
(74) *Attorney, Agent, or Firm* — SoraIP, Inc.

(57)     ABSTRACT

A control unit executes: acquiring an actual image that is an image captured by the imaging unit; acquiring a calibration image that is an image captured by the imaging unit in the past and serving as a reference for the current background; generating a model for estimating a region where a shadow exists and correcting the color tone; and adding a shadow corresponding to the actual image to the calibration image based on the calibration image and the model and correcting the color tone and generating an estimated background image, which is a corrected image and is a background image corresponding to the actual image.

4 Claims, 6 Drawing Sheets

(56) References Cited

FOREIGN PATENT DOCUMENTS

| | | | |
|----|----------------|------|---------|
| JP | 2019-204333 | A | 11/2019 |
| JP | 6687659 | B2 | 4/2020 |
| JP | 2022-121153 | A | 8/2022 |

OTHER PUBLICATIONS

Tsiktsiris, et al., "Real-Time Abnormal Event Detection for Enhanced Security in Autonomous Shuttles Mobility Infrastructures", MDPI Journal Sensors 2020, vol. 20, doi: 10.3390/s20174943, Sep. 1, 2020, pp. 1-24.

Aisin Corporation, "Participation in Demonstration Experiment by Otsu City and Keihan Bus selected for Medium Size Automated Bus Demonstration Project_starting demonstration of medium size automated bus equipped with a tipping over risk notification system", News disclosed on Homepage of Aisin Corporation, Aug. 27, 2020, p. 1.

Jacques et al., "A Background Subtraction Model Adapted to Illumination Changes", 2006 International Conference on Image Processing (ICIP), pp. 1817-1820, (Oct. 11, 2006), https://ieeexplore.ieee.org/document/4106905.

* cited by examiner

INFORMATION PROCESSING DEVICE FOR DETECTION OF BACKGROUND OF IMAGE

CROSS-REFERENCE TO RELATED APPLICATION

This application claims priority to Japanese Patent Application No. 2023-024554 filed on Feb. 20, 2023, incorporated herein by reference in its entirety.

BACKGROUND

1. Technical Field

The present disclosure relates to an information processing device.

2. Description of Related Art

There is known a technique of simultaneously expressing and learning texture, color, brightness pattern of a scene in which a background is captured, and movement using a Gram matrix, thereby enabling the background and a foreground to be separated using information on the texture etc. even when a brightness value similar to the background is input (e.g. Japanese Unexamined Patent Application Publication No. 2010-058903 (JP 2010-058903 A)).

SUMMARY

An object of the present disclosure is to improve the detection accuracy of the background of an image.

An aspect of the present disclosure provides
an information processing device including
a control unit configured to:
acquire an actual image that is an image captured by an imaging unit;
acquire a calibration image that is an image previously captured by the imaging unit and that serves as a reference for a present background;
generate a model for estimating a region in which a shadow is present and performing color tone correction based on the actual image; and
generate an estimated background image based on the calibration image and the model, the estimated background image being an image obtained by adding a shadow corresponding to the actual image to the calibration image and performing color tone correction on the calibration image and being a background image corresponding to the actual image.

Another aspect of the present disclosure provides a Mobility as a Service (MaaS) providing method that uses the above information processing device.

Another aspect of the present disclosure provides an information processing method in which a computer executes processes in the above information processing device, a program for causing a computer to execute the processes, or a storage medium that stores the program in a non-transitory manner.

According to the present disclosure, it is possible to improve the detection accuracy of the background of an image.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
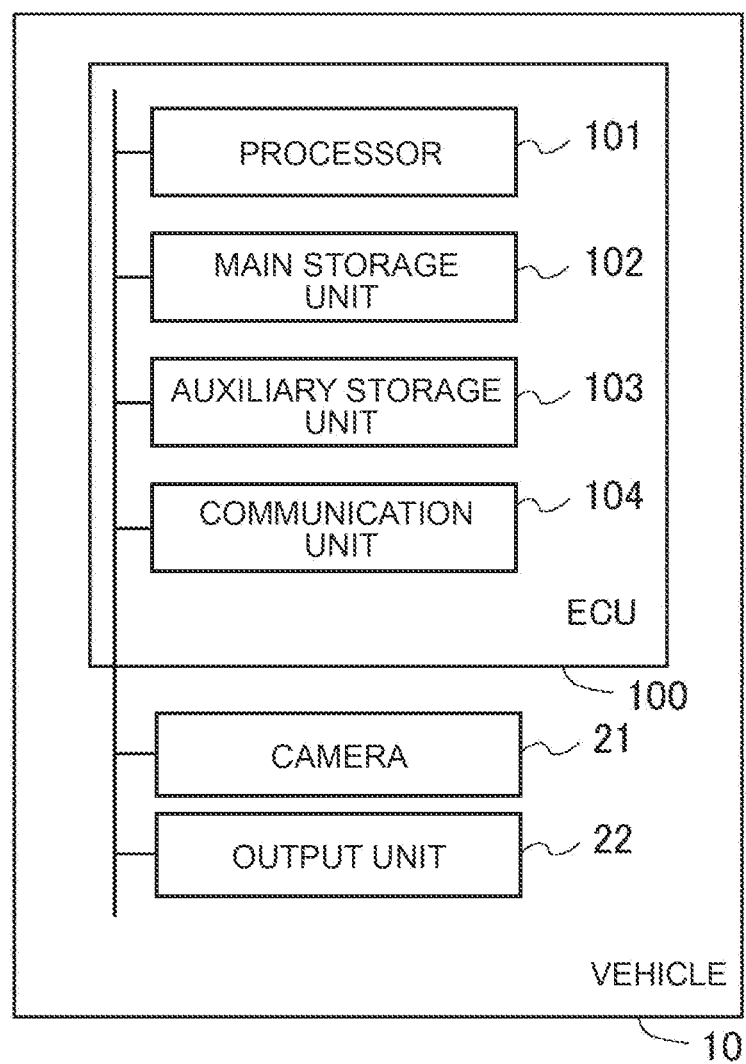
FIG. 1 is a diagram showing the hardware configuration of a vehicle according to an embodiment.

The conventional background subtraction method is based on the premise that images are taken with a fixed camera, and objects that move quickly are detected as the foreground. Here, in a running vehicle, in addition to the background seen from the vehicle window, shadows inside the vehicle may move relatively quickly. If such a shadow is extracted as the foreground, it may be detected that a person or object has entered a restricted area, for example.

It is also conceivable to detect a person or an object by comparing the factory-shipped image with an image acquired in real time. However, after the vehicle is shipped from the factory, for example, when the interior is changed or when a sticker or the like is attached to the floor, there is a possibility that these may be determined to be foreign matter.

Therefore, an information processing device, which is one aspect of the present disclosure, includes a control unit configured to: acquire an actual image that is an image captured by an imaging unit; acquire a calibration image that is an image previously captured by the imaging unit and that serves as a reference for a present background; generate a model for estimating a region in which a shadow is present and performing color tone correction based on the actual image; and generate an estimated background image based on the calibration image and the model, the estimated background image being an image obtained by adding a shadow corresponding to the actual image to the calibration image and performing color tone correction on the calibration image and being a background image corresponding to the actual image.

A real image is, for example, an image captured in real time by an imaging unit. The actual image may be, for example, an image at the current point in time. The calibration image is an image corresponding to the current background, for example, an image captured after a sticker has been pasted on the floor or the interior has been changed, and it is an image captured in the absence of any foreign matter. The calibration image is an image captured by the imaging unit each time the floor surface is changed or when erroneous detection of foreign matter increases due to dirt. Also, the calibration image is an image captured without a person. The actual image and the calibration image are acquired by the control unit after being captured by the imaging unit.

Also, the control unit generates a model for estimating a region where a shadow exists and correcting the color tone based on the actual image. This model is generated by, for example, extracting a shadow candidate region from the luminance distribution of an actual image, comparing the shadow candidate region with the previously generated estimated background image to determine the estimated shadow region, and determining a correction parameter for bringing the color tone of the calibration image closer to the color tone of the actual image by comparing the actual image and the calibration image. In this model, areas where people are present are excluded from areas where shadows are present.

In this way, the control unit generates a model for estimating shadowed areas based on the real image. Then, by applying this model to the calibration image, an estimated background image, which is an image obtained by adding a shadow to the calibration image, is generated. This estimated background image is an image that simulates the background at the time the actual image was captured. Also, the estimated background image is an image from which foreign matter is excluded. In this way, an image corresponding to the background can be obtained.

Hereinafter, embodiments of the present disclosure will be described with reference to the drawings. The configurations of the following embodiments are illustrative, and the present disclosure is not limited to the configurations of the embodiments. Further, the following embodiments can be combined as much as possible.

First Embodiment

FIG. 1 is a diagram showing the hardware configuration of a vehicle 10 according to the embodiment. The vehicle 10 is a vehicle used in MaaS, for example, and is capable of autonomous travel. The vehicle 10 includes an ECU 100 as an electronic control unit, a camera 21 and an output unit 22. These components are interconnected by a CAN bus, which is the bus of the in-vehicle network.

The ECU 100 has a computer configuration. The ECU 100 includes a processor 101, a main storage unit 102, an auxiliary storage unit 103 and a communication unit 104. The components are connected to each other by a bus. Note that the processor 101 is an example of a control unit.

The processor 101 is a Central Processing Unit (CPU), a Digital Signal Processor (DSP), or the like. The processor 101 controls the vehicle 10 and performs various information processing operations. The main storage unit 102 is a random access memory (RAM), a read only memory (ROM), or the like. The auxiliary storage unit 103 is an erasable programmable ROM (EPROM), hard disk drive (HDD), removable media, or the like. The auxiliary storage unit 103 stores an operating system (OS), various programs, various tables, and the like. The processor 101 loads the program stored in the auxiliary storage unit 103 into the work area of the main storage unit 102 and executes it, and through the execution of this program, each component is controlled. Thereby, the ECU 100 realizes a function that meets a predetermined purpose. The main storage unit 102 and the auxiliary storage unit 103 are computer-readable recording media.

A communication unit 104 is means for communicating with a center server or a user terminal or the like via a network. The communication unit 104 is, for example, a Local Area Network (LAN) interface board or a wireless communication circuit for wireless communication. For example, remote monitoring of the vehicle 10 can be performed via the communication unit 104.

The camera 21 is means for imaging the inside of the vehicle 10. The camera 21 images at least the floor surface near the entrance of the vehicle 10. The camera 21 takes images using an imaging device such as a Charge Coupled Device (CCD) image sensor or a Complementary Metal Oxide Semiconductor (CMOS) image sensor. The image acquired by photographing or filming may be either a still image or a moving image.

The output unit 22 is means for presenting information to passengers or crew members, such as a Liquid Crystal Display (LCD) panel, an Electroluminescence (EL) panel, a lamp (warning light), or a speaker. Alternatively, the output unit 22 may be means for notifying an external center server or the like of the abnormality via the communication unit 104.

Figure 2:
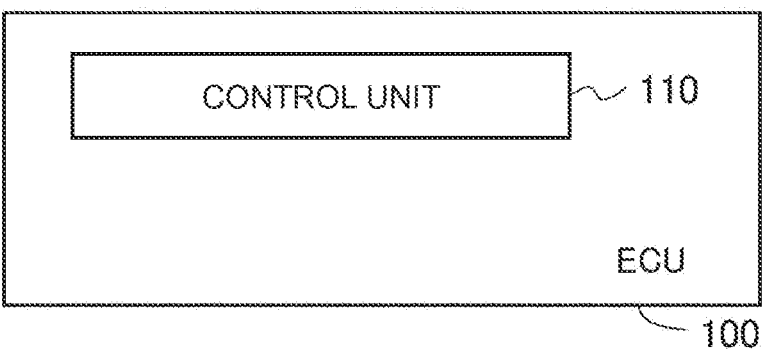
FIG. 2 is a diagram showing an example of functional components of an ECU according to the embodiment.

Next, functional components of the ECU 100 of the vehicle 10 will be described. FIG. 2 is a diagram showing an example of functional components of the ECU 100 according to the embodiment. ECU 100 includes a control unit 110 as a functional component. The processor 101 of the ECU 100 executes the processing of the control unit 110 according to the computer program on the main storage unit 102.

Figure 3:
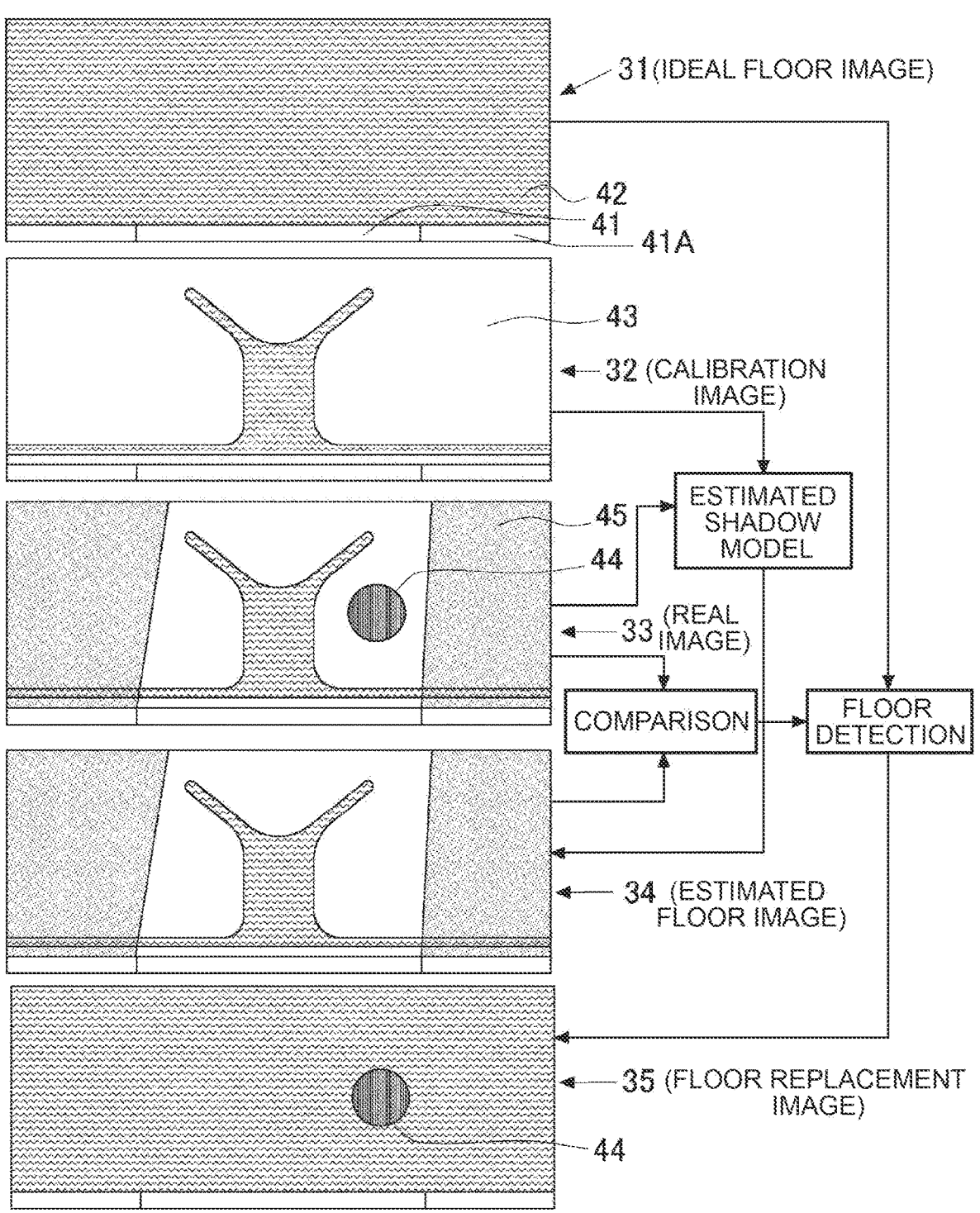
FIG. 3 is a diagram showing an example of an image when the control unit determines whether a foreign object exists.

The control unit 110 analyzes the image acquired from the camera 21 and determines the presence or absence of foreign matter. FIG. 3 is a diagram showing an example of an image when control unit 110 determines the presence or absence of a foreign object. The control unit 110 generates or acquires the ideal floor surface image 31, the calibration image 32, the real image 33, the estimated floor image 34, and the floor replacement image 35, and stores them in the auxiliary storage unit 103 to perform image-based decisions. These images are images corresponding to the floor surface 42 including the entrance/exit 41 of the vehicle 10, and are images corresponding to the same location. The entrance/ exit 41 is provided with a door 41A. The ideal floor surface image 31 is an example of an ideal background image, the estimated floor image 34 is an example of an estimated background image, and the floor replacement image 35 is an example of a background replacement image.

The ideal floor surface image 31 is an image taken at the time of shipment from the factory, and is an image in the initial state. Since this image is common to other vehicles, the control unit 110 may acquire an image captured by another vehicle of the same type, for example, from the center server. Control unit 110 performs machine learning on whether a foreign object exists. Then, control unit 110 determines whether a foreign object exists based on this machine learning model. This machine learning uses an ideal floor surface image 31 captured by another vehicle of the same type. This machine learning may also be performed on other vehicles of the same type. Alternatively, when the user performs a predetermined input for obtaining the ideal floor surface image 31 at the time of shipment from the factory, the camera 21 captures an image of the floor surface, and the image obtained at this time is used as the ideal floor surface image. A floor surface image 31 may be used. In this case, a user interface for capturing the ideal floor surface image 31 may be provided.

The calibration image 32 is an image captured when a change occurs in the floor surface 42 of the vehicle 10, and in the example of FIG. 3, the image is captured after the sticker 43 is attached to the floor surface 42. The calibration image 32 is an image captured without any foreign matter. For example, when the user performs a predetermined input to acquire the calibration image 32, the camera 21 may capture an image, and the image acquired at this time may be used as the calibration image 32. In this case, it may have a user interface for capturing the calibration image 32. For example, calibration image 32 may be captured each day before vehicle 10 is driven.

The real image 33 is an image captured by the camera 21 in real time. A foreign object 44 such as an object or a person and a shadow 45 may appear in the real image 33. The control unit 110 causes the camera 21 to capture the real image 33 at predetermined intervals, for example.

The estimated floor image 34 is an image of the floor surface at the point in time when the pseudo-generated real image 33 is captured (this may be the current point). The estimated floor image 34 is generated by adding a shadow to the calibration image 32 and correcting the color tone. The control unit 110 generates the estimated floor image 34 using the estimated shadow model. The estimated shadow model is a model for estimating the state of the floor surface 42 and shadows. As for the method of extracting the shadow from the real image 33, a conventional technique can be used. For example, the estimated shadow model includes information on each of the shadow candidate area, estimated shadow area, illumination correction parameters, and estimated human area.

Figure 4:
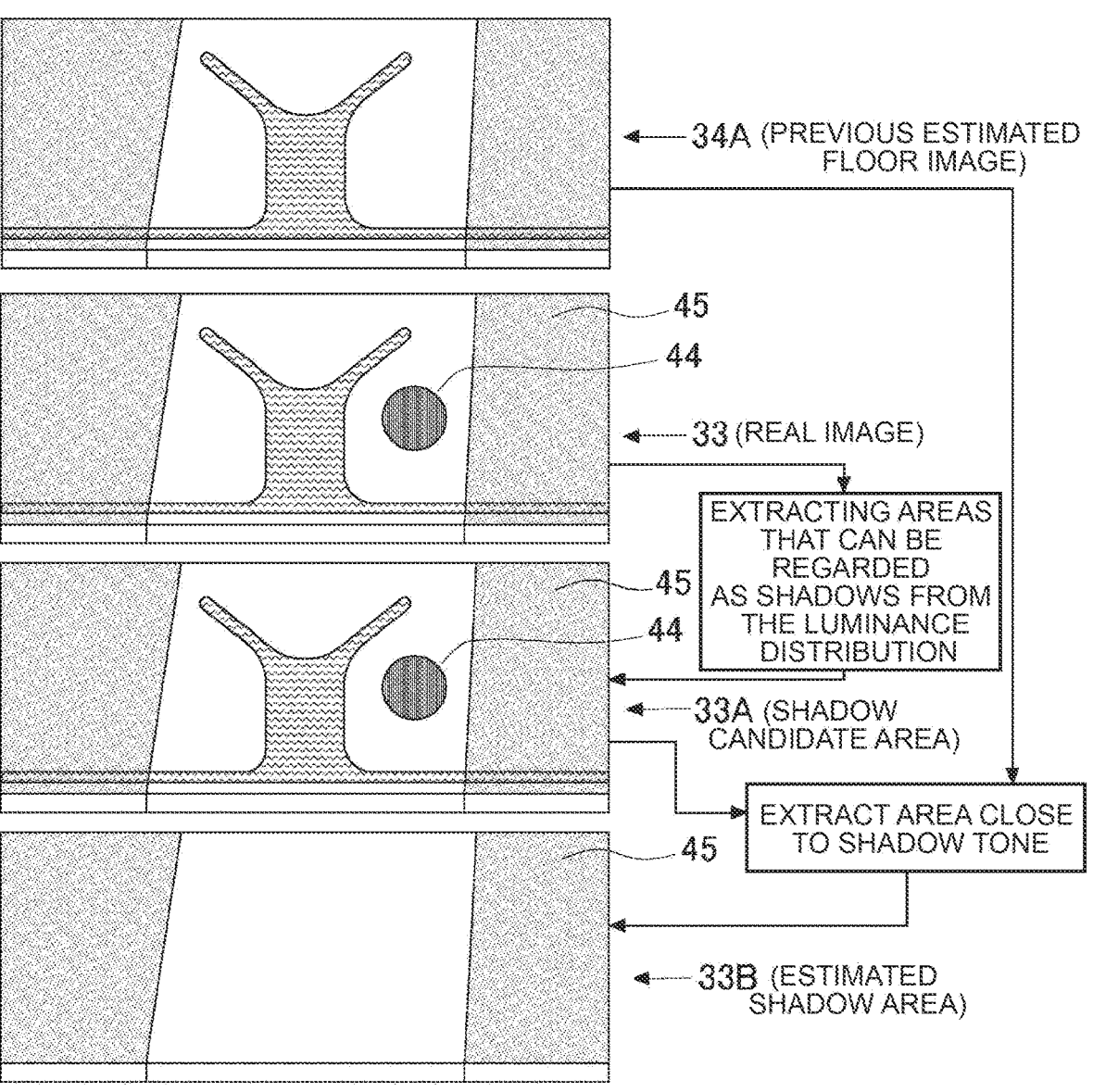
FIG. 4 is a diagram for explaining the estimated shadow model.

FIG. 4 is a diagram for explaining the estimated shadow model. The shadow candidate area 33A is an area that can be regarded as a shadow, and is extracted from the luminance distribution of the entire real image 33. A known technique can be used for this extraction. The estimated shadow area 33B is an area in the shadow candidate area 33A that can be said to have a similar texture to the previous estimated floor image 34A, and is extracted from the shadow candidate area 33A. The previous estimated floor image 34A is the estimated floor image generated in the previous routine and stored in the auxiliary storage unit 103. At this time, an area close to the texture of the shadow portion in the previous estimated floor image 34A is extracted. However, the shadow candidate area 33A is an area excluding an estimated person area described later. A known technique can be used for the model for this extraction. The illumination correction parameter is a correction coefficient for bringing the color tone of the calibration image 32 closer to the color tone of the real image 33. The control unit 110 determines illumination correction parameters for each of the estimated shadow area 33B and the estimated bright area, which is an area other than the estimated shadow area 33B. Illumination correction parameters are determined by comparing the calibration image 32 and the real image 33. Note that a known technique can be used for the illumination correction parameters. The estimated human area is an area in which a person is estimated to exist, and is an area acquired by general deep learning or the like.

Thus, an estimated shadow model is generated. Since this estimated shadow model does not change with time with respect to the real image 33, it is possible to exclude fast-moving shadows as described later.

The floor replacement image 35 is an image obtained by replacing the background of the real image 33 with the ideal floor surface image 31. The control unit 110 detects the floor surface 42 by comparing the real image 33 and the estimated floor image 34. A known technique can be used for this detection. For example, a background subtraction method may be used. Then, the control unit 110 generates a floor replacement image 35 by replacing the portion of the floor surface 42 detected in the real image 33 with the image of the same portion of the ideal floor surface image 31. At this time, the foreign object 44 remains in the floor replacement image 35 without being replaced.

Based on the floor replacement image 35 generated in this way, the control unit 110 detects the foreign object 44. For example, a model for detecting the foreign object 44 generated by deep learning or the like may be stored in the auxiliary storage unit 103. A known technique can be adopted as the technique for detecting the foreign object 44 based on the floor replacement image 35. For example, the foreign object 44 may be detected by a heuristic method that the foreground has a predetermined area or more. A simple normal and abnormal two-class classification technique may also be used.

When the control unit 110 detects the foreign object 44, for example, the control unit 110 executes notification processing. In this notification process, for example, a warning is sent from the output unit 22. For example, an announcement to keep the foreign object 44 away from the entrance/exit 41 is made by voice, or a display to keep the foreign object 44 away from the entrance/exit 41 is displayed. Further, the control unit 110 may prevent the opening and closing of the door 41A when the foreign object 44 is detected.

Figure 5:
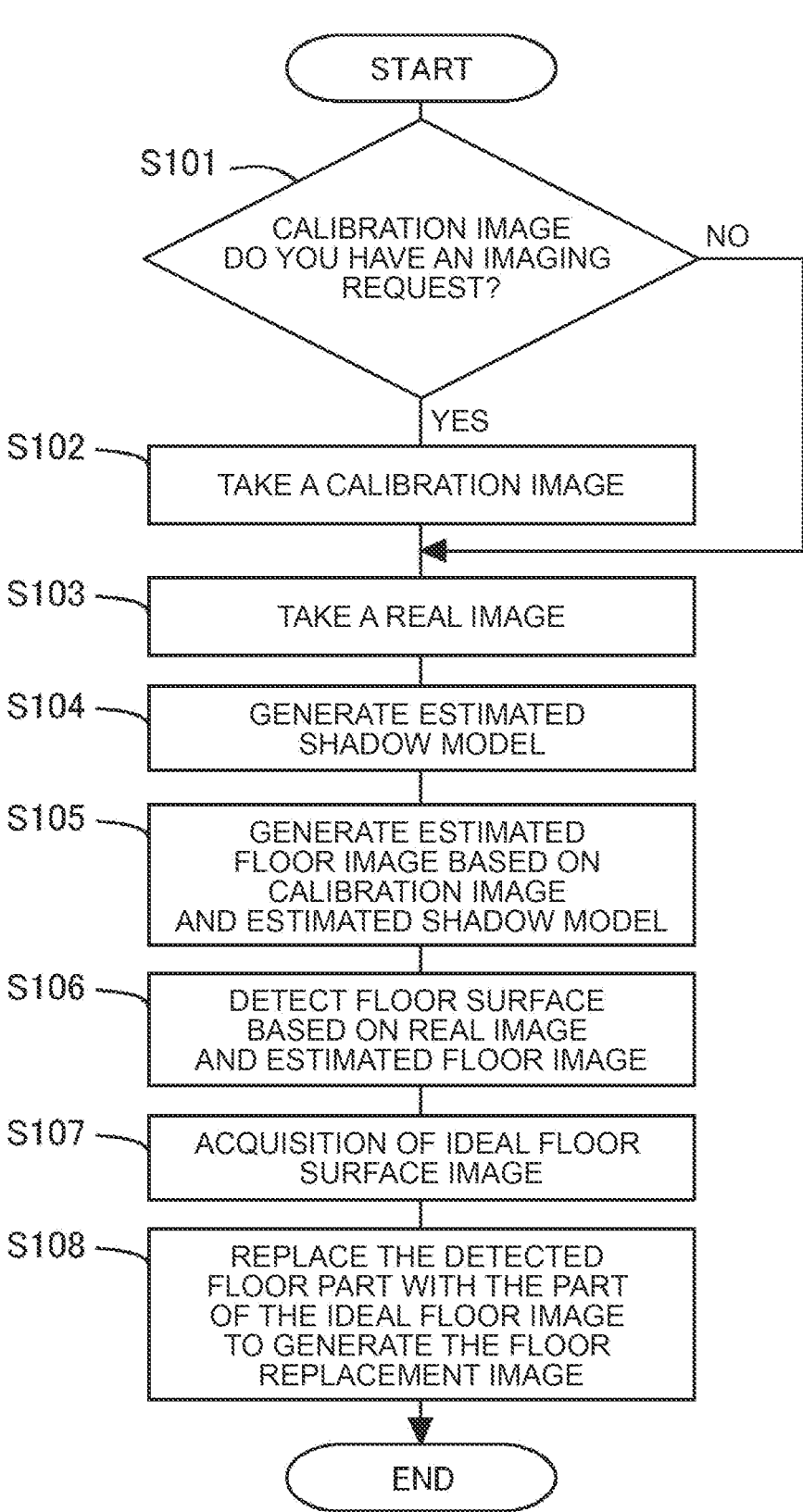
FIG. 5 is a flowchart of processing for generating a floor replacement image in the ECU of the vehicle according to the embodiment.

Next, the process of generating the floor replacement image 35 in the ECU 100 of the vehicle 10 will be described. FIG. 5 is a flowchart of processing for generating the floor replacement image 35 in the ECU 100 of the vehicle 10 according to the embodiment. The processing shown in FIG. 5 is executed in the ECU 100 at predetermined time intervals. Note that the ideal floor surface image 31 will be described as being already stored in the auxiliary storage unit 103.

In S101, the control unit 110 determines whether there is a request to capture the calibration image 32. The calibration image 32 is captured when the state of the floor surface 42 changes. Therefore, for example, when the state of the floor surface 42 changes, the center server transmits a request to capture the calibration image 32 via the communication unit 104. Alternatively, for example, when a predetermined input is made to the user interface within the vehicle 10, the control unit 110 determines that there is a request to capture the calibration image 32. If the determination in S101 is affirmative, the process proceeds to S102, and if the determination is negative, the process proceeds to S103.

In S102, the control unit 110 captures the calibration image 32. The control unit 110 instructs the camera 21 to capture an image, and causes the auxiliary storage unit 103 to store the obtained image as the calibration image 32.

In S103, the control unit 110 captures the real image 33. The control unit 110 instructs the camera 21 to capture an image, and causes the auxiliary storage unit 103 to store the acquired image as the real image 33.

Figure 6:
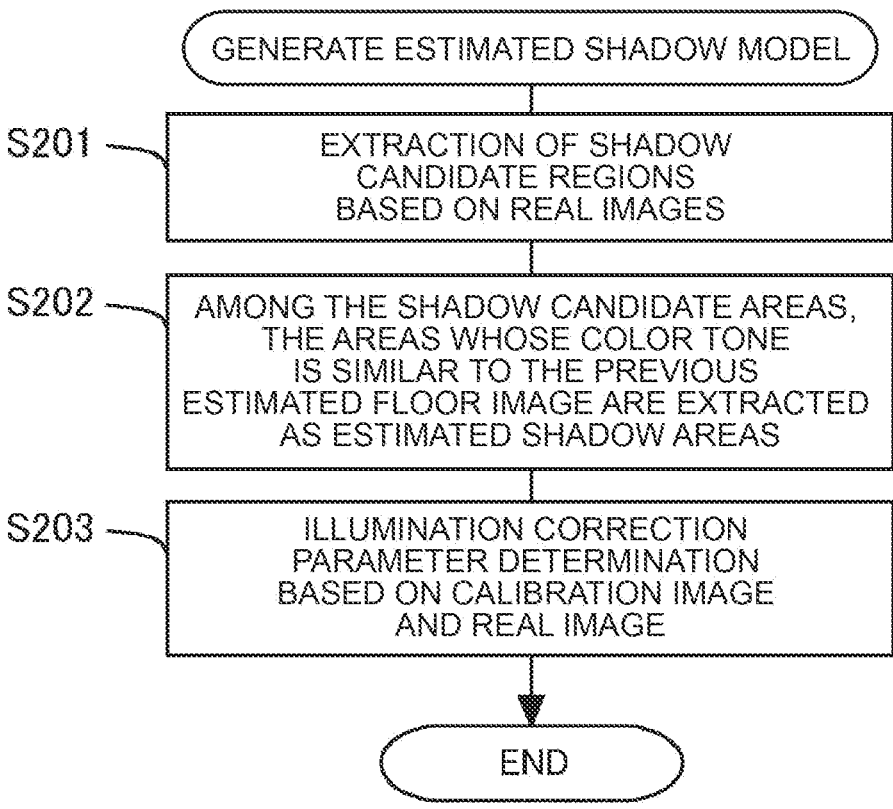
FIG. 6 is a flowchart showing an example of processing for generating an estimated shadow model.

In S104, the control unit 110 generates an estimated shadow model. Here, FIG. 6 is a flowchart showing an example of processing for generating an estimated shadow model. In S201, the control unit 110 extracts the shadow candidate area 33A based on the real image 33. Here, a region that can be regarded as a shadow is extracted from the luminance distribution of the entire image. In S202, the control unit 110 extracts, from the shadow candidate area 33A, an area whose texture is close to the estimated floor image (previous estimated floor image 34A) generated by the previous routine shown in FIG. 5 as an estimated shadow area. It should be noted that whether the textures can be said to be close may be determined according to conditions stored in advance in the auxiliary storage unit 103. In S203, the control unit 110 determines illumination correction parameters for each of the estimated shadow area 33B and the estimated bright area by comparing the calibration image 32 and the real image 33.

Returning to FIG. 5, at S105, the control unit 110 generates the estimated floor image 34 based on the calibration image 32 captured at S102 and the estimated shadow model generated at S104. The generated estimated floor image 34 is stored in the auxiliary storage unit 103. In S106, the control unit 110 detects the floor surface 42 based on the real image 33 captured in S103 and the estimated floor image 34 generated in S105. At this time, the floor surface 42 excluding the foreign object 44 appearing in the real image 33 is detected. In other words, control unit 110 detects the background portion.

In S107, the control unit 110 acquires the ideal floor surface image 31. Since the ideal floor surface image 31 is stored in the auxiliary storage unit 103 in advance, the control unit 110 reads the ideal floor surface image 31 from the auxiliary storage unit 103. In S108, the control unit 110 replaces the portion of the floor surface 42 detected in S106 with the corresponding portion in the ideal floor surface image 31 acquired in S107, thereby generating the floor replacement image 35.

The floor replacement image 35 generated in this manner is an image in which the foreign object 44 remains and the shadow and sticker are removed. Since the floor surface (or the background) is in the same state as when machine learning was performed to detect the foreign object 44, the learned machine learning model can be used to accurately detect the foreign object 44.

Here, if a sticker or the like is pasted on the floor surface when machine learning was performed, or if the interior is changed to a different pattern, when trying to detect foreign objects using the machine learning model, the sticker or interior There is a risk that the material or the like will be detected as a foreign object. Further, while the vehicle 10 is running, the shape of the shadow cast on the floor also changes from moment to moment as the state of the light entering the vehicle from the windows changes from moment to moment. Therefore, the conventional logic may detect the shadow as a foreign object.

On the other hand, in the present embodiment, by replacing the portion determined to be the floor portion with an ideal floor surface image 31 prepared in advance, the foreign object 44 can be easily detected using, for example, a learned machine learning model. Therefore, a large-scale operation such as performing machine learning again after the start of operation of the vehicle 10 is not required, so maintenance costs can be significantly reduced.

OTHER EMBODIMENTS

The above-described embodiments are merely examples, and the present disclosure may be appropriately modified and implemented without departing from the scope thereof. The processes and means described in the present disclosure can be freely combined and implemented as long as no technical contradiction occurs. Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function. For example, the processing in the above embodiments may be executed by a computer outside the vehicle.

In one example, the vehicle 10 or the ECU 100 according to the embodiment may be used to provide Mobility as a Service (MaaS), which is a service utilizing mobility. Also, in one example, the processing procedures shown in FIGS. 5 and 6 may be executed when providing MaaS using the vehicle 10 or the ECU 100. In this case, the information processing method according to the above processing procedure is an example of the MaaS providing method.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, HDD, etc.) and an optical disc (compact disc read-only memory (CD-ROM), digital versatile disc (DVD), Blu-ray disc, etc.), a ROM, a RAM, an EPROM, an electrically erasable programmable read only memory (EEPROM), a magnetic card, a flash memory, an optical card, and any type of medium suitable for storing electronic commands.

What is claimed is:

1. An information processing device comprising a control unit configured to:

acquire an actual image that is an image captured by an imaging unit;

acquire a calibration image that is an image previously captured by the imaging unit and that serves as a reference for a present background;

generate a model for estimating a region in which a shadow is present and performing color tone correction based on the actual image;

generate an estimated background image based on the calibration image and the model, the estimated background image being an image obtained by adding a shadow corresponding to the actual image to the calibration image and performing color tone correction on the calibration image and being a background image corresponding to the actual image;

acquire an ideal background image that is an image in an initial state;

generate a background replacement image based on the actual image, the estimated background image, and the ideal background image, the background replacement image being an image obtained by replacing a background portion of the actual image with a corresponding portion of the ideal background image; and determine presence or absence of foreign matter based on the background replacement image.

2. The information processing device according to claim 1, further comprising a storage unit that stores a trained machine learning model for determining the presence or absence of the foreign matter based on the ideal background image, wherein the control unit is configured to determine the presence or absence of the foreign matter by inputting the background replacement image into the trained machine learning model.

3. The information processing device according to claim 1, wherein the imaging unit is arranged inside a vehicle, and captures an image of at least an entrance/exit of the vehicle.

4. The information processing device according to claim 1, wherein the control unit is configured to generate the model by:

extracting a shadow candidate region, as a candidate for a shadow region, from a brightness distribution of the actual image;

extracting an estimated shadow region from the shadow candidate region through a comparison with an estimated background image generated previously; and determining a correction parameter for approximating a color tone of the calibration image to a color tone of the actual image through a comparison between the actual image and the calibration image.

\* \* \* \* \*